April 15, 1924.
J. J. BARTOS
TRUCK PLOW
Filed April 24, 1923
1,490,724
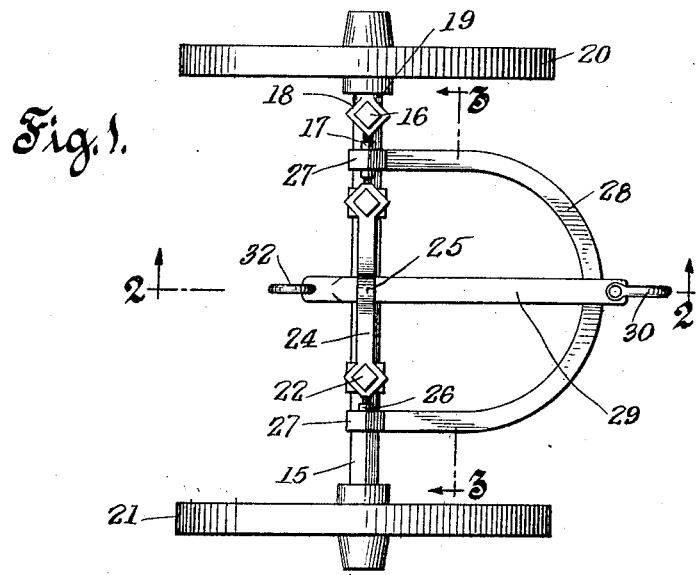
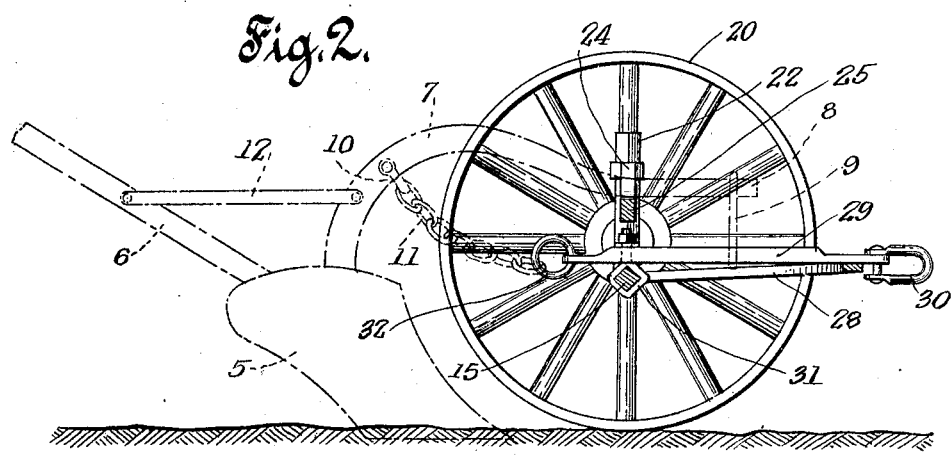
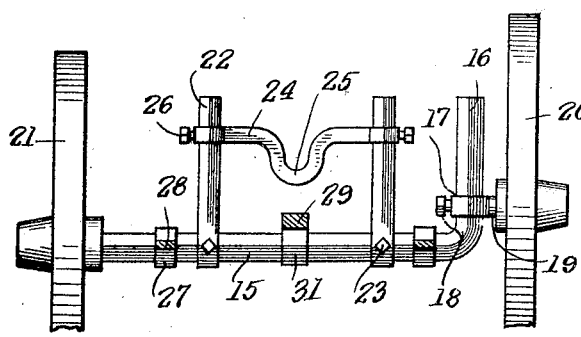
INVENTOR
Jerry J. Bartos
BY
Marvin Lahup
ATTORNEY Patented Apr. 15, 1924.

1,490,724

UNITED STATES PATENT OFFICE.

JERRY J. BARTOS, OF PHILLIPS, WISCONSIN.

TRUCK PLOW.

Application filed April 24, 1923. Serial No. 634,234.

*To all whom it may concern:*

Be it known that I, JERRY J. BARTOS, a citizen of United States, residing at Phillips, in the county of Price and State of Wisconsin, have invented certain new and useful Improvements in Truck Plows, of which the following is a specification.

This invention relates to improvements in agricultural implements of the plow type and has as its object to provide an attachment whereby a plow beam or the like may be adjustably controlled with reference to the surface of the soil, such control measurably defining the depth which the plow share enters the soil.

Another purpose is to produce a wheeled device for the purpose, thereby eliminating friction as far as possible.

A further aim is in the provision of a simple, strong, effective and relatively inexpensive attachment which can be applied to any ordinary type of plow without change in the same.

These objects are attained by the novel construction, combination and arrangement of parts hereafter described and shown in the annexed drawing, in which:—

Figure 1 is a top plan view showing the attachment as assembled ready to be applied.

Figure 2 is a sectional view of the same illustrating its application, the section being taken substantially on line 2—2 of Figure 1.

Figure 3 is a transverse sectional view thereof, taken on line 3—3 of Figure 1.

Referring particularly to Figure 2 of the drawing, a conventional type of plow is shown in the broken lines, in which the share is designated by the numeral 5, the handle 6 and the curved beam 7.

The front end of the beam is straight for a distance, as at 8, and has connected to it a link or flattened loop 9, to which the haulage means (not shown) is usually attached.

A clevis 10, pivoted in the beam above the share 5 is engaged with one end of a chain 11 and the usual bar connections 12 extend between the beam and handle.

The attachment is composed of an axle 15, preferably made of a square bar which is bent up at one end into a right angle projection 16.

Fitted to slidably engage the axle member 16 is an encircling band 17 which upon being adjusted can be secured by the set screw 18.

The opposite end of the band is formed into a pintle 19 on which is revolubly secured one of the support wheels 20, and a similar wheel 21 is revoluble on the oppositely extending end of the axle.

Fitted to the main central portion of the axle 15 are a pair of uprights 22 adjustably secured by set screws 23 and on which is a yoke 24 having a centrally downwardly looped portion 25, the yoke being secured when in adjustment by set screws 26.

Engaging the axle 15 beyond the uprights 22, are clips 27 from which a loop 28 extends toward the front.

A draw-bar 29 rests on the front of the loop 28 and is provided at its front with a clevis 30 by which attachment can be made to a haulage means.

The rear end of the draw-bar 29 passes over the axle 15 to which it is connected by the clip 31, below the loop 25 and carries a ring 32 engaging the chain 11.

The draw-bar also passes through the link 9 and the beam member 8 rests in the loop 25.

Thus the beam may be raised or lowered by adjusting the screws 26, causing the plow share point to enter the soil at variable depths, and the wheel 20 can obviously be adjusted to maintain the axle substantially level.

Having thus described my invention, what I claim as new and desire to secure by Letters Patent, is:—

1. A plow attachment comprising an axle having a raised right angular member at one end, a pintle adjustably carried by said member, a wheel on said pintle, another wheel at the opposite end of said axle, a pair of uprights adjustably secured to said axle, a yoke having a depressed loop center adjustable vertically on said uprights, a loop supported by said axle to extend to the front, a draw-bar fixed on said axle extending over said loop, means for securing the beam of the plow in said yoke, and operative connections between said draw-bar and the plow beam.

2. A plow attachment comprising an axle having a raised right angular member at one end, a pintle adjustably carried by said member, a wheel on said pintle, another wheel at the opposite end of said axle, a pair of uprights adjustably secured to said axle, a yoke having a depressed loop center adjustable vertically on said uprights, a rigid loop connected at its ends to said axle, a draw-bar fixed on said axle at the center thereof, means for holding the beam of a plow in said yoke, a clevis at the outer end of said draw-bar, and flexible connections between the plow beam and rear end of said draw-bar.

In witness whereof I have affixed my signature.

JERRY J. BARTOS.